April 16, 1968 J. FOUFOUNIS 3,378,264

AUTOMATIC RECORD PLAYER

Filed Jan. 10, 1967 4 Sheets-Sheet 1

United States Patent Office 3,378,264
Patented Apr. 16, 1968

3,378,264
AUTOMATIC RECORD PLAYER

Jean Foufounis, 27b Chemin du Chene, Renens, Switzerland

Continuation-in-part of application Ser. No. 330,350, Dec. 13, 1963. This application Jan. 10, 1967, Ser. No. 613,717
Claims priority, application Switzerland, Dec. 13, 1962, 14,618/62
37 Claims. (Cl. 274—10)

ABSTRACT OF THE DISCLOSURE

Automatic record player where a record magazine is moved relative to a record playing device by a predetermined amount corresponding to a selected record. A record is lifted to playing position and a pickup head is shifted into operation. Control is accomplished by operating two superposed rows of keys cooperating with feeler levers. A pivotal rack, that has parallel straight portions connected by two curved portions, cooperates with a driving pinion to relatively position the magazine and the player.

This application is a continuation-in-part of my previous application Ser. No. 330,350, filed Dec. 13, 1963, now abandoned.

By way of example, the accompanying drawings illustrate a preferred embodiment of the invention. In said drawings:

FIGURE 1 is a lateral elevational, partly sectional view;

FIGURE 1*a* is a view of a detail of FIGURE 1 on a larger scale;

Figure 1:
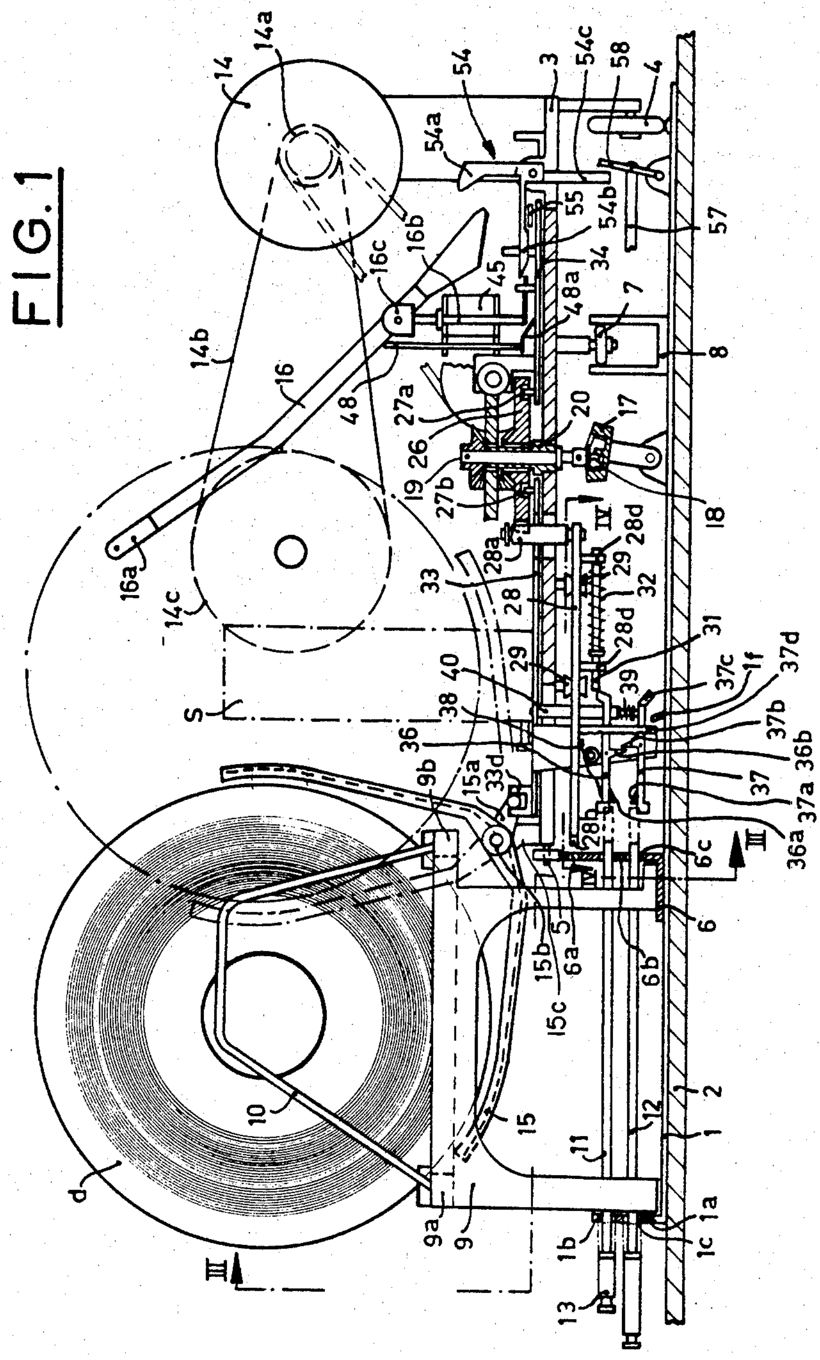
Figure 1A:
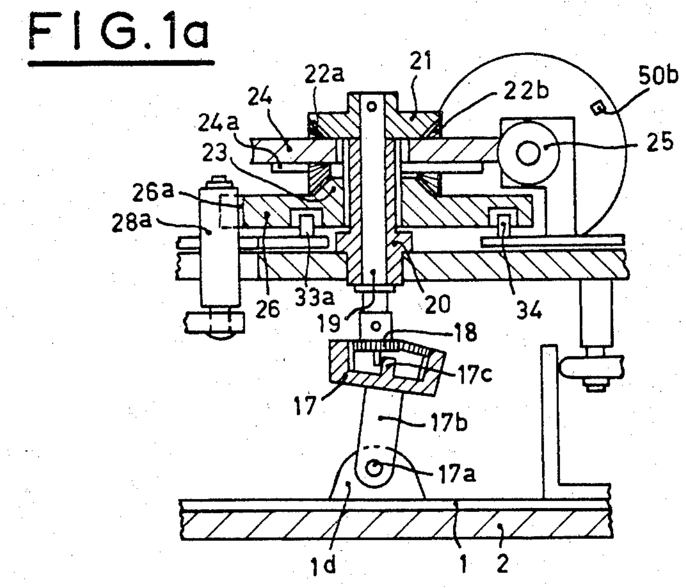

The record player illustrated is secured to a lower carrier plate 1 carried by the bottom 2 of a carrying case, partly illustrated, which allows an easy transportation of the record player.

The claimed record player includes a carriage 3 forming a support for the pickup means and resting on said bottom plate by means of a pair of rollers 4 resting directly on the bottom plate and of a pair of rollers 5 resting on an angle bar 6 rigid with said bottom plate. Two horizontal rollers 7 run along the inner surfaces of an upwardly U-shaped member 8 secured to bottom plate 1 parallel with angle bar 6 so as to ensure the guiding of carriage 3 during its travel in a direction perpendicular to the plane of FIGURE 1.

The left-hand end of carrier plate 1 is furthermore folded back parallel with angle bar 6 so as to form with the latter a housing for removable magazine 9 adapted to carry a number of records *d* and including two terminal flanges, of which one is shown in FIGURE 1, said flanges being interconnected by cross-members 9*a* and 9*b* between which a series of bent transverse members extends so as to hold the records vertically.

The folded section 1*a* of the carrier plate 1 is provided with two superimposed rows of ports 1*b*, 1*c*, each pair of cooperating ports registering with one of the records *α* and lying in coaxial relationship with corresponding ports 6*b*, 6*c* formed in angle bar 6.

In alined ports 1*b* and 6*b* and in alined ports 1*c* and 6*c*, corresponding to the location of each record in the magazine, are slidably fitted rods 11 and 12, the left-hand end of each of which carries a head 13 (FIGURES 1 and 2) through which the corresponding rod may be grasped by the operator's fingers so as to be shifted out of the position illustrated in solid lines into the position illustrated in dot-and-dash lines and inversely. The rods 11 and 12 form a memory for the record player and their total number is equal to twice the number of records adapted to be fitted between bent transverse members 1*c*. As a matter of fact, when a rod 11 is urged inwardly, the record player selects the corresponding record and plays only its front surface whereas when a rod 12 is depressed, the record player will play the other surface of said record, as will be disclosed hereinafter.

The carriage 3 carries motor 14 adapted to drive said carriage across the record magazine to control the removal of the selected record by lever 15 and to shift said record into registry with the reading head 16*a* carried by a double pickup arm 16 rockably secured to the carriage 3.

The drive of said carriage is effected in the case illustrated by means of an endless rack 17 meshing with pinion 18. The slightly transversely shiftable rack 17 includes two rectilinear sections parallel with U-shaped member 8 and interconnected by semi-circular sections, said rack being pivotally secured at 17*a* through lug 17*b* to lug 1*d* projecting above carrier plate 1, in a manner such as to have a rocking movement in a vertical plane. In its medial part, between the rectilinear sections, rack 17 is provided with a longitudinal rib 17*c* adapted to hold the rack in contacting relationship with the pinion throughout the movement of the latter.

The operation of said arrangement will be readily understood since, when the pinion 18 is caused to rotate, it moves first in a predetermined direction over one of the rectilinear sections of the rack, for instance the left-hand section, the rack being then shifted into the right-hand position.

When pinion 18 engages the incurved section of the rack connecting the left-hand rectilinear section over which the pinion has already travelled with the right-hand section, rack 17 rocks throughout the movement of the pinion over last-mentioned right-hand rectilinear section of the rack. The carriage 3 thus makes a simple reciprocating movement perpendicular to the plane of FIGURE 1 and moves in a predetermined direction when the pinion meshes with the left-hand section of the rack and in the opposite direction when said pinion meshes with the right-hand section.

The pinion 18 is secured to the lower end of vertical shaft 19 revolvably carried inside a sleeve 20 rigidly secured to the carriage and the upper end of which shaft carries toothed wheel 21 meshing with two bevelled planet pinions 22*a* and 22*b* which mesh also with a second toothed wheel 23 coaxial with the toothed wheel 21.

The bevelled planet pinions 22*a* and 22*b* are rotatably carried on two spindles (not illustrated) and extend radially with reference to the vertical shaft 19 being secured to a support 24*a* rotatably fitted round the sleeve 20, said spindles entering two corresponding openings formed in toothed plate 25 rigid with said support 24*a*. The toothed plate 24 meshes with a worm 25 adapted to be operatively connected with the motor 14 as will be described hereinafter.

The toothed wheel 23 is cut in the upper surface of a disc-shaped cam 26 fitted loosely round the sleeve 20, the edge of which is provided with a notch at 26*a*. The lower surface of said cam is furthermore provided with groove 27 including two semi-circular sections 27*a*, 27*b* the former of which extends coaxially with the cam over 180° while the second section which has a larger radius interconnects the two ends of the section 27*a*.

Figure 2:
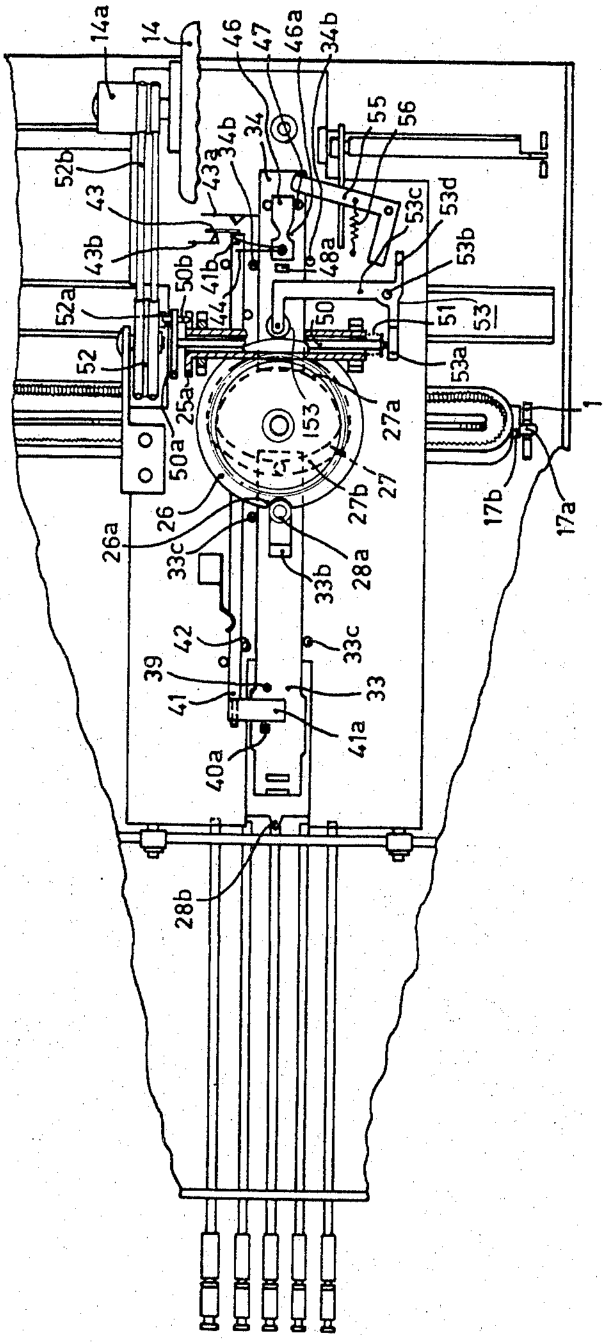
FIGURE 2 is a plan view thereof.

Notch 26*a* lying on the axis of symmetry of groove 27*a*–27*b* is adapted to be engaged by a projection 28*a* secured to the end of a bar 28 and adapted to lock cam 26 in the angular position illustrated in FIGURE 2.

Figure 3:
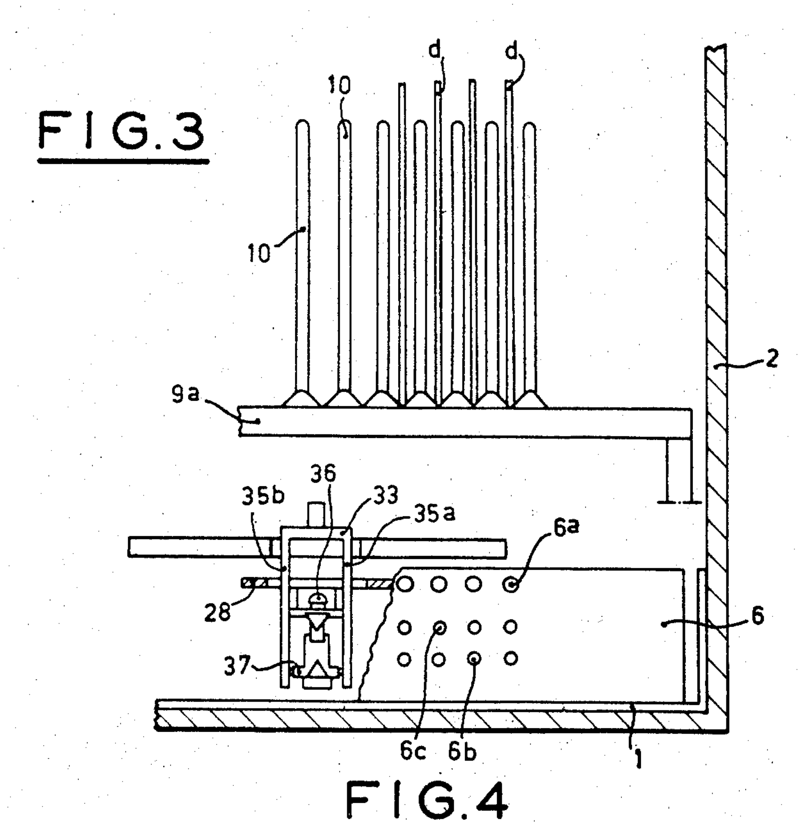
FIGURE 3 is a cross-section through line III—III of FIGURE 1.

The opposite end of bar 28 is provided with nose 28b adapted to engage one of the ports 6a (FIGURE 3) provided in the angle bar 6 in vertical registry with each above-mentioned pair of openings 6b, 6c. The engagement of nose 28b in port 6a produces a locking of carriage 3 in a predetermined position corresponding as will be disclosed hereinafter to the position of the selected record in the record magazine which position is defined through depression of one of rods 11 and 12 or even through the simultaneous depression of both rods corresponding to a given record.

The bar 28 is thus applied to be shifted between two extreme positions of which one corresponds to the locking of cam 26 against rotation and the other to a locking of carriage 3 against movement relative to the record.

When bar 28 prevents the carriage from moving (that is when the shaft 19 is locked and the worm drives the toothed plate 24) planet wheels 22a, 22b merely move round the stationary wheel 21 and drive into rotation cam 26 through the agency of toothed wheel 23 rigid therewith.

When on the contrary, cam 26 is locked by bar 28 and carriage 3 is free, planet wheels 22a, 22b move round toothed wheel 23 and drive toothed wheel 21 and thereby the pinion 18 through the agency of the shaft 19 so that carriage 3 moves now in a direction perpendicular to the plane of FIGURE 1.

Figure 4:
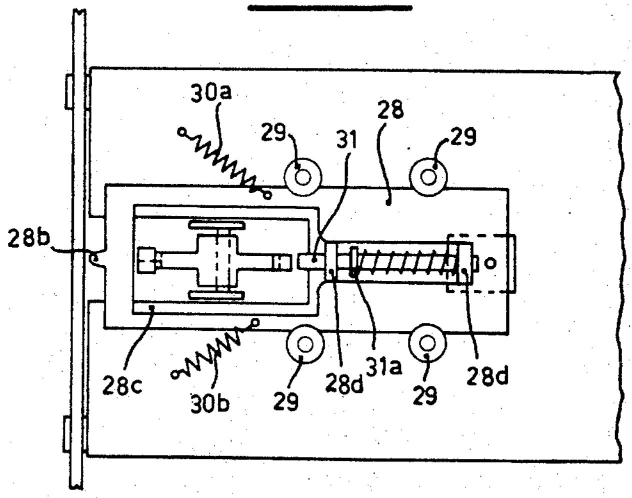
FIGURE 4 is a cross-section through IV—IV of FIGURE 1 on a larger scale.

As illustrated in FIGURES 1 and 4, bar 28 consists of a small rectangular plate provided in its left-hand section with gate 28c and adapted to slide underneath carriage 3 with the interposition of four rollers 29 revolvably carried by said carriage. Two springs 30a, 30b urge bar 28 towards the left-hand side of FIGURES 1 and 2 so as to make nose 28b engage one of the ports 6a or else to urge said nose against angle bar 6 when it registers with a point between two ports 6a. The bar 28 is provided furthermore with two lugs 28d between which is slidingly fitted a rod 31 while a spring 32 stretched between lug 28d on the right-hand side of gate 28c and stop 31a rigid with rod 31 urges said rod towards the left-hand side of FIGURES 1 and 2. The stress exerted by said spring is greater than that exerted on bar 28 by two springs 30a and 30b.

Therefore, if the movement of rod 31 towards the left-hand side of the drawing is prevented, for instance, by means of a stop engaging its left-hand end springs 30a and 30b can in no case draw bar 28 towards the left because spring 32 prevents such movement. When, on the contrary, rod 31 is not locked in position axially, springs 30a, 30b can shift bar 28 towards the right since spring 32 can no longer act.

The cam 26 is adapted to control the movements of two sliders 33, 34, lying on either side of said cam by a relative shifting of 180°, slider 33 engaging cam groove 27 through stud 33a engaging section 27b of said groove (FIGURE 1) while slider 34 engages, through stud 34a, section 27a of groove 27. Reference character 33b designates a slot cut in slider 33 and forming a guide for projection 28a terminating bar 28. The slider 33 is adapted to move between guiding pins 33c and slider 34 between guiding pins 34b.

To slider 33 are secured two parallel depending lugs 35a, 35b (FIGURE 3) projecting through gate 28c in bar 28 (FIGURE 4). Between said lugs and pivotally secured thereto there are provided two horizontal superposed levers 36, 37 of which the former (36) is subjected to the action of spring 38 (FIGURE 1), urging it in an anti-clockwise direction while second lever 37 is subjected to the action of rod 39 elastically sliding inside tube 40 secured vertically to slider 33, the upper end of rod 39 being flush with the surface of said slider as long as lever 37 remains in a horizontal position, while it projects beyond said surface as soon as lever 37 begin rocking in an anti-clockwise direction, as seen in FIGURE 1. During its clockwise angular movement under the action of the elastically mounted rod 39, lever 37 engages stop 37d.

The levers 36, 37 lie at the same level as rods 11, 12 respectively. Furthermore, when said rods are entirely urged home into the positions illustrated in dot-and-dash lines their ends lie in registry wtih the left-hand ends of the levers 36, 37 which form feelers. As a matter of fact, the extreme left-hand end of each lever 36 or 37 forms a dihedron (FIGURE 3) of which the ridge extends substantially at the same level as the axes of corresponding rods 11 or 12. The dihedron terminating the lever 36 is arranged in a manner such that when said lever impinges against rod 11 upon shifting of carriage 3 toward the left, said rod causes lever 36 to rock clockwise as shown in FIGURE 1 whereas, in the case of lever 37 the dihedral feeler of which faces upwardly towards the dihedron terminating the lever 36, the engagement of rod 12 produces a rocking of the lever in an anti-clockwise direction. The levers 36, 37 are provided also with corresponding stops 36a, 37a (FIGURE 1) adapted to urge rods 11, 12 back out of their positions shown in dot-and-dash lines into their solid line position upon shifting of slider 33 when the corresponding record has been removed out of its magazine.

The levers 36, 37 are furthermore kinematically connected with each other through noses 36b, 37b projecting beyond the cooperating surfaces of said levers at the same level as their pivotal connections with lugs 35a, 35b, nose 37b being longer than nose 36b. Any counterclockwise rocking movement of lever 36 under the action of spring 38 is thus transmitted through nose 36b to lever 37 which latter lever executes then a clockwise rocking movement towards its stop 37d. In a similar manner, any counterclockwise rocking of lever 37 is directly transmitted through the noses 37b and 36b to lever 36 which is shifted angularly, in the clockwise direction, but in contradistinction any rocking in the clockwise direction of lever 36 has no effect on lever 37 which remains in contact with its stop 37d under the action of elastically mounted rod 39.

The right-hand end of lever 36 slopes upwardly to a slight extent and forms a stop for the previously described rod 31 as long as said lever 36 remains in its horizontal position; this means that bar 28 remains in the position illustrated in FIGURE 1 for which it locks the cam 26, as long as the lever 36 does not meet any rod 11 and is rocked thereby in a clockwise direction. In contradistinction as soon as the lever 36 has slightly rocked through contact between its dihedron and a rod 11, the bar 28 which is no longer locked by its rod 31 is driven towards the left-hand side of FIGURES 1 and 2 by springs 30a, 30b in a manner such that its nose 28b comes into contact with angle bar 6 and engages opening 6a, lying above the rod 11, which has produced the rocking of lever 36. As described, carriage 3 is then held fast in a manner such that cam 26, which is no longer locked by the projection 28a, is adapted to be driven into rotation by toothed plate 24.

The rotation of cam 26 produces a shifting towards the left-hand side of slider 33 as long as stud 33a on said slider moves inside section 27b on groove 27; shifting of stud 33a in the other section 27a of groove 27 corresponds to the positioning of slider 33 at the extreme left-hand end of its stroke.

During its leftward movement, slider 33 controls thus the return of rod 11 into its inoperative position through action of the stop 36a on lever 36 on the end of said rod. The slider 33 controls also the removal of the selected record out of the magazine and the shifting of said record onto the turntable which is not illustrated in the drawing and is pivotally secured to the support S drawn in dot-and-dash lines. The rotation of the record is always ensured by motor 14 and belt 14b, tensioned between pulley 14a on the motor and a cooperating pulley 14c forming a flywheel controlling a speed reversal which is not illustrated and which is similar to that forming the object of the United States Patent 3,190,133, filed Apr. 8, 1963.

The driving means for a record carried by the support S may be identical with that disclosed in Swiss Patent No. 361,671, filed on Nov. 3, 1959, by the applicant and need not be described with any detail.

The left-hand side of slider 33 carries an upwardly directed fork **33*d* engaging a stud carried by the end of arm 15*a* rigid with lever 15 pivotally secured to spindle 15*b* fitted between two lugs 15*c* secured to carriage 3**.

As illustrated, lever 15 adapted to shift the selected record out of the magazine and to bring it into the area adjacent the support S is constituted by two arms of which the upper edge is provided with a groove inside which the edge of the selected record runs while it is carried along from its solid line position into its dot-and-dash line position.

When lower rod 12 is urged into the position illustrated in dot-and-dash lines, lever 37 is caused to rock under the action of said rod in a counter-clockwise direction and this rocking is transmitted to the lever 36 which in its turn rocks under the action of the interengagement between noses **37*b* and 36*b* in a clockwise direction. The rod 31 is thus released and bar 28 is allowed to move towards the left-hand side of FIGURES 1 and 2 under the action of its springs 30*a*, 30*b* as when lever 36 is rocked directly. The leftward movement of the slider 33 controlled by the now released cam 26 produces a return of rod 12 into its position illustrated in solid lines under the action of stop 37*a***.

When lever 37 engages, through its feeler end, the lower section of the rod 12, rod 39, fitted in the tube 40, projects above the surface of slider 33 and locks laterally, through cooperation with a pin **40*a*, a lug 41*a* guided between pairs of rollers 42 revolvably carried by the carriage so that rod 41 may be shifted parallel to sliders 33, 34. The right-hand end of rod 41 is rigid with a switching blade 43 engaging a contact piece 43*a* as long as said rod is in the position illustrated in FIGURE 2 and said switching blade is urged onto a second contact piece 43*b* when the rod 41 has been shifted leftwards. The blade 43 and contact-pieces 43*a*, 43*b* form the components of a reversing switch adapted to reverse the feed of motor 14 incorporating a double winding whereby its direction of rotation is reversed. As a matter of fact, as long as rod 41 is in said position illustrated in FIGURE 2, blade 43 cooperates with contact-piece 43*a* and motor 14 ensures the rotation of the record carried by the support S in a predetermined direction, pickup arm 16 being then in contacting relationship with one surface of said record. When, on the contrary, rod 12 is selected as described and the end of rod 39 projects above the surface of slider 33, rod 41 urges blade 43 onto contact piece 43*b***. The reversal of the direction of rotation of the record may also be obtained mechanically through the arrangement described in said U.S. Patent 3,190,133. The motor rotates then in a direction opposed to the previously described direction so as to allow the playing of the opposite side of the record.

Pickup arm 16 is duplicated and each elementary arm or tine is provided with a reading head **16*a*; the record is positioned on the support S between the two tines of the pickup arm which engages either one side or the opposite side of said record according as to whether a rod 11 or a rod 12 has provided the release of cam 26. The pickup arm 16 is connected with rod 41 through two elastic levers 44 engaging a pin 41*b* on rod 41 and secured to the lower end of a vertical rod 16*b* revolvably carried in a support 45 secured to the carriage. Said rod 16*b* is provided at its upper end with two lugs 16*c* between which pickup arm 16** is held so that it may be caused to rock in a vertical plane.

To the lower end of rod **16*b* is secured a plate 46 provided in the medial section of its longitudinal edges with two notches 46*a* extending above the slider 34 between two guiding studs 47. Said studs are adapted to prevent any rocking of pickup arm 16 round its axis 16*b* as long as slider 34 occupies the position illustrated in FIGURE 2; for which position the record is held between the pickup needles with a spacing with reference thereto. When, on the contrary, slider 32 has been shifted towards the left-hand side of FIGURE 2 by the cam 26, the two guiding studs 47 engage a position facing notches 46*a* in plate 46 so that the latter is adapted to be shifted laterally by a sufficient amount for the tip of one of the pickup needles carried by the corresponding tines 16 of pickup arm 16 to engage the record surface facing it, according to the position of rod 41 under the action of the twin springs 44. Since the movements of sliders 33, 34 is first shifted by the positioning of rod 41 and then it is released and urges the tip of the corresponding pickup needle against the record as soon as plate 46** is released and allowed to rock.

It should also be mentioned that, in order to return the pickup arm into its angular position corresponding to the beginning of the groove on either side of the record, especially after the playing of each record, there is provided a rod 48 which is slidingly fitted in support 45 and engages through its upper end the lower surface of arm 16 whereas its lower end rests on a slope **48*a* formed on slider 34. This arrangement is designed in a manner such that when a record has been played, that is, when the slider 34 has returned into the position illustrated in FIGURE 2 by moving from the left-hand side to the righthand side, incline 48*a* urges the arm 16 upwardly up to the desired level; this being done however only after the plate 46 has been centered under the action of the studs 34*b***.

With the record player illustrated, it is possible to select both sides of the same record and to listen to them without carriage 3 moving. The two rods 11, 12 when urged inwardly provide a rocking of two levers 36, 37 as disclosed but, since nose **37*b* is longer than nose 36*b* the slope assumed by lever 36 is larger than that obtained in the case where only a rod 11 is depressed. Said slope is such that the dihedron forming a feeler for lever 36 extends above the rod 11 whereby when the first surface of the record has been played and slider 33 has been shifted towards the left so as to shift rod 11 and 12 back only the rod 12 is shifted back by the stop 37*a*. The cam 26 executes therefore a first revolution round its axis which corresponds to the playing cycle of one surface of the record after which, rod 31 not being locked axially by lever 36**, a second revolution of the cam allows the playing of the other surface of the record.

The claimed record player makes possible also playing again immediately the record carried by a predetermined record surface. The carrier plate 1 carries, to this end, a cam **1*f* cooperating with a nose 37*c* provided on the right-hand side of lever 37, said cam projecting throughout the length of a series of records and producing the rocking of lever 37 and consequently of the lever 36 as soon as slider 33 has reached its extreme left-hand position. Said rocking is furthermore such that the ends of the levers 36, 37 extend above the level of the cooperating rods 11, 12** whereby it is always possible to urge either of said rods back inwardly while the corresponding record is being played.

Once a record has been fed onto the support 8 by lever 15 the driver of the slider 33 controlling said lever 15 should be obviously cut out; in other words: the worm 25 must be stopped and this is allowed by a clutch system to be described hereinafter.

The worm 25 is provided with an axial recess inside which is slidingly fitted a rod 50 while a spring 51 urges the latter downwardly as illustrated in FIGURE 2. The upper end of said rod 50 carries a plate **50*a* provided with a pin 50*b*** slidingly engaging a radial slot in a flange 25*a* rigid with the worm 25. The upper end of the pin 50*b* extends into the path of an abutment 52*a* carried by a transmission pulley 52 connected with motor 14 through belt 52*b*. The whole arrangement is such that when the rod 50 occupies the position illustrated in FIGURE 2, the pulley 52 drives said rod and the worm 25 whereas when said rod 50 is shifted downwardly under the action of the spring 51 the worm is no longer driven.

The rod 50 is held in its clutch operated position by the arm 53*a* of a rocking member 53 pivotally secured at 53*b* to a stationary part while its other arm 53*c* engages, with the interposition of a roller 53 the edge of the cam 26 at a point diametrically opposed to the locking projection 26*a*.

When the cam 26 has executed one half revolution through 180° and its notch 26*a* registers with the roller on the arm 53*c* of the rocking member, the latter rocks anti-clockwise by an amount sufficient for the pin 50*b* on the rod 50 to be no longer engaged by the abutment 52*a*. Said pin is therefore no longer driven nor is the worm 25 so that the cam 26 is angularly locked by the rocking member. At this moment the sliders 33, 34 occupy both their extreme positions on the left-hand side of FIGURE 2 and the pickup arm 16 begins reading the selected record.

When the record has been played, that is when the pickup arm 16 is in its lowermost position, said arm engages, through its rear end, nose 54*a* on lever 54 pivotally secured to the carriage 3 so as to be capable of turning in a vertical plane; arm 54*b* of said lever is adapted to engage, through the notch formed in its lower edge, the end of a L-shaped lever 55 against the action of return spring 56. The stress exerted by said spring predominates over that produced by spring 51 acting on rod 50 when connected kinematically, through rocking member 53, with rod 50.

The engagement between pickup arm 16 and nose 54*a* produces a clockwise rocking of lever 54 and the release of lever 55 the shorter arm of which engages, under the action of the spring 56, and 53*d* of rocking member 53. The spring 56 acts on rocking member 53 through lever 55 and its action is sufficient for said rocking member to rock clockwise against the action of spring 51 on rod 50 by an amount sufficient for pin 50*b* carried by rod 50, shifted by rocking member 53, to engage the abutment 52*a* of the cam-shaped pulley 52; worm 25 is therefore driven again at the end of the playing of one surface of the selected record.

Cam 26 continues revolving and returns the sliders 33, 34 into their right-hand positions as seen in FIGURE 2. The slider 34 urges the lever 55 back into its cocked position against the action of their spring 56, but this does not produce a disconnection since the roller on the arm 53*c* canont engage the notch 26*a* of the cam so that the clutch remains locked in its operative condition.

The playing of a record may also be interrupted by exerting a horizontal outward movement on a draw member 57 whereby a lever 58 is caused to rock and to thereby shift clockwise lever 54 through engagement with its lower end 54*c*.

Figure 5:
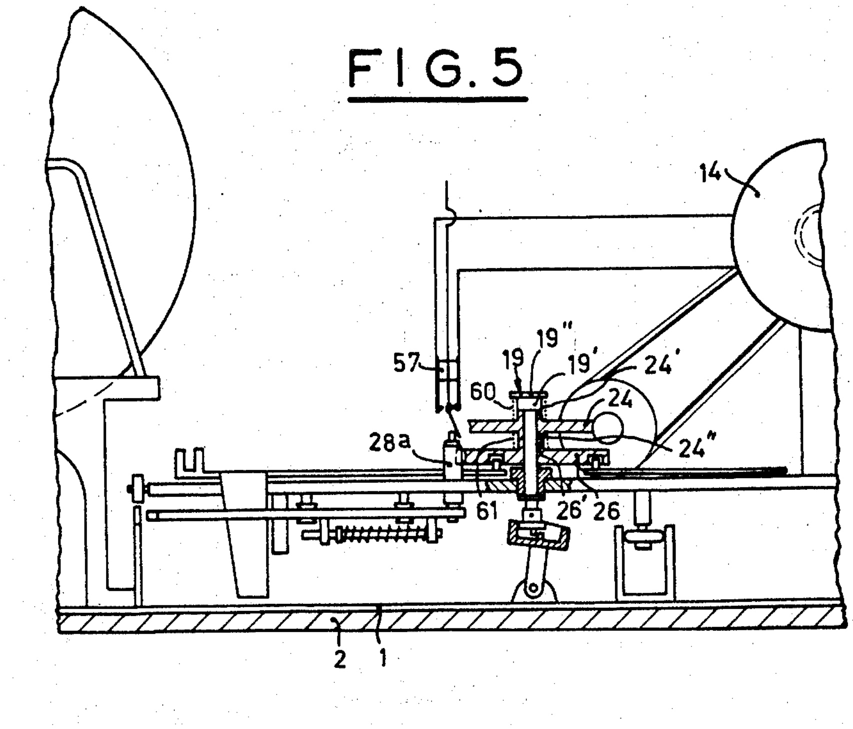
FIGURE 5 is an elevational view of a modification.

In a modification illustrated in FIGURE 5, cam 26 or the shaft 19 is driven selectively by the plate 24 through the agency of a clutch including two helical springs 60, 61 secured at one end to the plate 24.

As illustarted, plate 24 is provided on each of its transverse surfaces with a cylindrical projection 24', 24'' respectively, extending in alignment with a corresponding projection 26' on the upper surface of the cam 26 and of a bearing 19' on the shaft 19 respectively. The latter is further more provided at its upper end with a head 19'' engaged by the spring 60. The motor 14 is a motor the direction of rotation of which may be reversed by switching its stator windings, as provided by a double contact switch 57.

The springs 60, 61 are wound in opposite directions in a manner such that when the motor revolves in a predetermined direction, the plate 24 drives cam 26 by tightening spring 61 round the projections 26', 24'' whereas, when the motor revolves in the opposite direction, said plate drives shaft 19 by a clamping of spring 60 round projection 24' and bearing 19'. It is therefore sufficient to make nose 28*a* control switch 57 in a manner such that motor 14 revolves in a predetermined direction as long as cam 26 is locked while the direction of rotation of the motor is reversed, as soon as nose 28*b* enters a port 6*a* in angle bar 6, so as to allow cam 26 to rotate.

My invention is obviously not limited to what has been described herein and illustrated and it covers all the embodiments falling within the scope of the accompanying claims and, in particular, it should be understood that the carriage of the record player may be replaced by a plate adapted to rotate inside an annular magazine and carrying all the parts described, said plate being rigidly secured directly to the shaft 19 while the rack 17 and the pinion 18 are cut out.

What is claimed is:

1. Automatic record player comprising:

(a) at least one record magazine, (b) at least one pickup arm, mounted on a support and including at least one pickup cartridge, (c) drive means for rotating a record to be played, (d) shifting means for shifting said pickup arm from a rest position to record-reading position, (e) selection means for selecting and locating a predetermined record located in said magazine, (f) lifting means for lifting and placing said record into engagement with said drive means, said lifting means being also operable to remove said record from engagement with said drive means, (g) moving means causing relative movements of said magazine and said support such that at the end of said movement said lifting means be in a position to engage said record, (h) said selection means comprising two superposed rows of keys carried by one of the two elements consisting of said magazine and said support, each key of the first of said rows corresponding to the first side of a record and each key of the second row corresponding to the second side of the record of a predetermined key of said first row, said keys being adapted to select a desired record and the desired side thereof, (i) said selection means additionally comprising two feeler levers secured to the other of said elements consisting of said magazine and said support, one of said feeler levers extending to the level of said first row of keys, the other of said feeler levers extending to the level of said second row, (j) one of said feeler levers, during said relative movement of said magazine and said support, actuating locking means by means of a contact with a key into operative position, without interfering with the other feeler lever, said locking means locking said magazine and said support at a predetermined position determined by the position of said key into operative position such that said lifting means can reach the corresponding record in said magazine, (k) the other feeler lever causing while in rocking motion due to a contact with an operative key operated from the other row of keys, (1) rocking of said first feeler lever similar to the rocking motion caused by the contact of said first feeler lever with the key of said first row, and (2) actuation of a device moving said pickup arm such that the cartridge is in a position to read the second side of the predetermined record, said record player characterized in that the position of said key and the position of said feeler levers intended to mutually cooperate are in a shape symmetrical relative to a plane perpendicular to the direction of said relative movement of said magazine and said support such that rocking motion of said feeler levers is identical whether said movement is in one direction or in the opposite direction.

2. A record player as defined in claim 1, wherein said keys consist of sliding rods adapted to be placed in two axial positions at least one of said positions corresponding to the selection of the side of the record to be played.

3. A record player as claimed in claim 1, wherein said feeler levers are adapted to pivot about axis against the action of springs, said axis extending perpendicular to the direction of slide motion of said keys and parallel to the direction of said relative movement of said magazine and said support, the feeling ends of said feeler levers forming a dihedron having a ridge lying in the plane of the rocking motion of each feeler lever and substantially allowing said slide motion of said keys to take place when said feeler levers are in inoperative position, and each feeler lever has on its side facing the other feeler lever a lug, said lugs having ends facing one another and one of said lugs contacting the other of said lugs during rocking motion of the feeler lever carrying the first mentioned lug so as to urge the other feeler lever into angular movement in a direction opposite to the direction of said rocking motion of said first feeler lever.

4. A record player as defined in claim 3, wherein the height of said lug of said other feeler lever is greater than the height of the lug of the first feeler lever so that the amplitude of the rocking motion of said first feeler lever due to the rocking motion of the second feeler lever is larger than the rocking motion of the first feeler lever caused by the contact of the feeling end thereof with one of said keys, in operative position.

5. Record player as defined in claim 4, wherein said locking means is secured to said magazine or said support, whichever is the mobile element, and comprises:

(a) a bar, return means urging said bar into engagement with a fixed portion of said record player, (b) a slider carrying a collapsible stop for actuating said bar, said collapsible stop preventing said locking and being adapted to collapse under the action of said selection means each time said mobile elements ought to be locked, (c) a resilient element producing a force larger than, and in opposite direction to the force produced by said return means, (d) a kinematic lock rigidly secured to said bar and capable of engagement with a cam driving said slider to rock said cam under the action of said resilient element against said return means and at a predetermined angular position of said cam, said slider urging said collapsible stop into engagement with said bar when said collapsible stop is not under the action of said selection means, said slider shifting said stop against the action of said return means so as to free said mobile element and to engage said kinematic lock with said cam when said cam is in said angular position, (e) a clutch coupling motor means to said cam when said bar locks said mobile element or to said moving means moving said mobile elements when said cam is locked.

6. A record player as defined in claim 5, wherein said collapsible stop is formed by a portion of one of said feeler levers, said bar carrying a rod adapted to slide substantially along an extension of said feeler lever, said resilient element being a spring wound around said rod between a stop member on said rod and a portion of said bar.

7. A record player as claimed in claim 6, wherein each feeler lever is provided with a lug adapted to urge the operated keys into inoperative position when said mobile element is locked onto the fixed element and during movement of said slider from a first to a second limit position.

8. A record player as claimed in claim 7, wherein the first feeler lever, when rocked by the other feeler lever takes a position such that said lug does not engage said operated key facing said lug during movement of said slider from its first to its second position.

9. A record player as defined in claim 8, wherein said second feeler lever actuates a second rod urged by a return spring and adapted to cause contact between said slider and a third rod when said feeler lever is in fully locked position, said second rod causing during movement of said slider from its first to its second position, displacement of said pickup arm carrying said pickup cartridge for reading the second side of said predetermined record.

10. An automatic record player comprising:

(a) at least one record magazine, (b) at least one pickup arm mounted on a support and carrying at least one pickup cartridge, (c) selection means for selecting and locating a predetermined record in the magazine, (d) lifting means adapted to place said predetermined record into engagement with a device affecting rotation of said record and into registry with said pickup cartridge and to return said record into said magazine, (e) drive means for rotating said record, (f) moving means causing relative movements of said magazine and said support such that said predetermined record registers with said lifting means at the end of said relative movement, and (g) shifting means for shifting said pickup arm from a rest position to a second position in which said pickup cartridge engages the sound track of said predetermined record, said shifting means being also operative to shift said pickup arm from said second position to said rest position, wherein said lifting and shifting means are operated by a single cam having a groove surrounding its axis of rotation and by means of which groove two sliders are operated, one controlling movement of said pickup arm and the other controlling the lifting and shifting motions, characterized in that said cam has a notch on its edge in which two opposite locking members may engage alternately, said locking members providing locking of said cam each time said cam completes an angular displacement of 180° and simultaneously providing actuation of two clutch devices which are adapted to interrupt the coupling between said cam and its motor means in either of the two rocking positions of said cam.

11. A record player as defined in claim 10, wherein said selection means frees the first of said opposite locking members when said predetermined record is localized and when the slider operated by said cam causes displacement of said locking member towards its locking position and causes said locking member to return to its own locking position, the movement of the second of said locking members into locking; interengagement with said notch, being operated by means of resilient means urging said second locking device in contact with the edge of said cam, the return movement of said second locking member to its position of rest being controlled by the pickup arm when said pickup arm is in an angular position in which the tip of the pickup cartridge engages the last portion of the sound track of said predetermined record.

12. A record player as defined in claim 10, wherein said locking means operated by said locking member consists of a differential driven by said motor means and causing said relative movements of said support and said magazine and movement of said cam, said relative movement taking place as soon as said cam becomes angularly locked.

13. A record player as defined in claim 10, wherein said locking means operated by said locking member consists of a toothed wheel mounted on a shaft and driven by said motor means and causing said relative movement, and of at least two springs, one extending between a portion of said wheel and a portion of the shaft on which said wheel is mounted, the turns of wire of each of said springs being wound in opposite directions with reference to the other spring such that when the toothed wheel rotates in a first direction, the cam is caused to rotate as well whereas when the toothed wheel rotates in the opposite direction said shaft only is rotated, and wherein a reversing switch is provided for controlling changes in the direction of rotation of said motor means, this switch being operated by the first of said locking members.

14. A record player according to claim 10, wherein said locking means is controlled by the second of said opposite locking members and couples with a second wheel constantly rotated by said motor means by means of a third wheel driving said locking means.

15. An automatic record player comprising at least one record magazine, at least one pickup arm connected to a support and carrying at least one pickup cartridge, selection means for locating a predetermined record placed in said record magazine, lifting means for placing said predetermined record in registry with said pickup cartridge and to replace it into said record magazine, moving means for said predetermined record, second moving means operative to cause a relative movement between said record magazine and said support such that said predetermined record registers with said lifting means at the end of said relative movement, said second moving means being such that said relative movement between said record magazine and said support and movements of said pickup arm, as well as control of said lifting means be effected by a single cam, a differential operated by means of motor means and comprising two wheels in engagement with at least a single idler wheel, one of said wheels being secured to a shaft causing said relative movement between said record magazine and said support, the other of said wheels being coupled to said cam, a double locking device capable to angularly lock either of said two wheels, such that whenever one of said wheels is locked the other is driven by said motor means.

16. A record player as defined in claim 15, wherein there are two idler wheels mounted on separate shafts and said two wheels are coaxial and said shaft is loosely mounted into a sleeve around which is rotatably mounted a plate forming one element of said differential by means of which said differential is coupled to said motor means, said plate being apertured such as to form two opposite windows through each of which one of said idler wheels is disposed, the shafts of said idler wheels being coaxial with each other and perpendicular to said shaft.

17. A record player as defined in claim 16, wherein said plate is toothed and is actuated by said motor means by means of a worm.

18. A record player as defined in claim 16, wherein said other wheel is rigidly secured to said cam.

19. A record player as defined in claim 16, wherein said differential is disposed onto a carriage forming said support and wherein said shaft carries a pinion meshing with a rack fixed to the casing of said record player, such that rotation of said pinion causes said carriage to move.

20. A record player as defined in claim 15, wherein said double locking device consists of a slider linked to said support and capable of radial displacements with respect to said cam, said slider including two locking lugs one of which engageable under the action of resilient means in a first position of said slider with a notch on the edge of said cam thereby angularly locking said cam and the second of said lugs capable of engagement, under the action of further resilient means and when said slider is located in a second limit position, with an aperture in said magazine, characteristic of the predetermined record, movement of said slider being caused (1) by said selection means, and (2) by a device operated by said cam.

21. An automatic record player comprising a record magazine, record playing means, means to shift said magazine relative to said record playing means along a straight path, a rack secured to one of said record magazine and said record playing means and fixed against translation along said path, said rack including two toothed straight portions parallel to the direction of said relative movement, and two curved portions connecting the ends of said straight portions, the other of said record magazine and record playing means carrying a driving pinion, and means maintaining said driving pinion in engagement with said rack in any position of said record magazine with respect to said record playing means, said rack being mounted for motion transverse to its straight portions each time said driving pinion leaves one of said straight portions and engages one of said curved portions.

22. A record player as defined in claim 21, wherein said rack is secured to at least one movable arm, said movable arm being connected to a shaft parallel to said straight path.

23. A record player as defined in claim 21, wherein said record magazine is secured to a casing of said record player, and said rack is connected to said casing, the player further including means for lifting a record to and from playing position, a carriage, a shaft connected to said carriage and to which said driving pinion is secured, motor means for driving said pinion, control means for said lifting device, said motor means and said record playing means connected to said shaft.

24. A record player as defined in claim 21, wherein there is an opening formed between said straight portions, and the teeth of said rack project towards the interior of said opening formed, said means urging said driving pinions into engagement with said rack comprises (1) a straight flange disposed in said opening and having sides equally spaced from said straight portions and ends equally spaced from said curved portions and (2) a nose projecting from the center of said driving pinions and constantly urged against either one of said sides of said flange, depending upon the position of said driving pinion with respect to said rack.

25. An automatic record player comprising a record magazine at least one pickup arm connected to a support and carrying at least one pickup cartridge, selection means for locating a predetermined record in said record magazine, lifting means to lead said predetermined record in registry with said pickup cartridge and to return said record to said magazine, drive means for rotating said record, moving means to cause a relative movement between said record magazine and said support such that said predetermined record be in registry with said lifting means at the end of said relative movement, having a single motor causing said relative movement, operating said lifting means and rotating said record and having a clutching device, said clutching device interrupting coupling between (1) said motor and said lifting means and (2) between said motor and said moving means when the predetermined record has been localized and brought into engagement with said pickup cartridge by means of said lifting means.

26. A record player as defined in claim 25, wherein said clutching device comprises a kinematic element secured to said motor and the member operative to cause said relative movement and capable of engagement with said kinematic element, said kinematic element and said member consisting of two coaxial discs mounted on a shaft, a third disc is loosely journaled to the shaft of said two discs between said two discs, said third disc including a pin engaging both of said two discs when said clutching device is engaged, said pin leaving one of said two discs when said clutching device is disengaged.

27. A record player as defined in claim 26, wherein the first of said two discs is associated with a worm whereas the third disc is secured to the end of the rod mounted within a longitudinal bore of said worm, the other end of said rod being urged: (1) by a spring urging said rod and the third disc in a position corresponding to the disengaged position of said clutching device and (2) by a rocking lever maintaining said rod and the third disc in a position corresponding to the engaged position of said clutching device against the action of said last mentioned spring when no record is playing.

28. A record player as defined in claim 25, having means operating said clutching device at least as soon as the reading of a record is ended so as to effect coupling between said motor and said lifting and said moving means.

29. A record player as defined in claim 28, having rocking means for said rocking lever so as to disengage said clutching device as soon as a record is into reading position, and further means returning said rocking lever into its first position at the end of said record reading.

30. A record player as defined in claim 29, wherein said coupling between said motor and said lifting and moving means is controlled by a rotating cam formed by a disc having a notch on its edge, characterized in that said rocking lever has three arms, one of which is operated by said rod, the second of which is in contact with the edge of the last mentioned disc and is capable of engagement with said notch by rocking of said lever under the action of said spring when said disc is in a predetermined angular position and therefore the clutching device is disengaged, and the third of said arms being used to return said rocking lever into the position wherein said clutching device is engaged.

31. A record player as defined in claim 30, wherein said disc causes movement of a slider during at least a portion of the rotation of said disc and has a spring-actuated rocker member, said rocker having one of its ends connected to said slider when said slider is moving in a direction tensioning said last mentioned spring, whereas the other end of said rocker is capable to engage the third arm of said rocking lever when the second arm of said rocking lever is in engagement with said notch of said disc and said rocker being subjected only to the action of said last mentioned spring.

32. A record player as defined in claim 31, having a locking lever adapted to engage a portion of said rocker when said rocker has been rocked by said slider and the last mentioned spring is under tension, this locking lever maintaining the rocker in this position and having a projection capable of engagement with an end of said pickup arm opposite to the pickup cartridge and, when this pickup arm is in an angular position corresponding to the end of the reading of the record, the engagement of said pickup arm and the projection of said locking lever causing an angular displacement of said locking lever sufficient to free the end of said rocker that is in engagement with said locking lever.

33. An automatic record player comprising at least one record magazine, at least one pickup arm rockably secured to a support and carrying at least one pickup cartridge, selection means for locating a predetermined record in said magazine, lifting means for placing this record in registry with said pickup cartridge and to return said record into said record magazine, drive means for rotating said record, moving means causing a relative movement of said record magazine and said support such that said predetermined record registers with said lifting means at the end of said relative movement, wherein said selection means comprises at least two superposed rows of keys extending from said record magazine or said support whichever does not move during said relative movement, the number of keys in one row corresponding at least to the number of records within said record magazine and each key of the first row being intended to select the first side of the predetermined record whereas the keys of the other row are for the other side of the predetermined record, the keys of one of said rows being longer than the other keys.

34. A record player as defined in claim 33, wherein the keys of the lower row are longer than the keys of the upper row.

35. A record player as defined in claim 34, wherein each set of one key in a first row and a second key in the second row corresponding to the same record are superimposed.

36. A record player as defined in claim 34, wherein each of said keys is secured to one end of a sliding member capable to operate, by means of its other end, said selection means when said sliding member is depressed.

37. A record player as defined in claim 33, wherein each of said keys have an annular groove for receiving the finger of the operator of the record player.

References Cited

UNITED STATES PATENTS

| | | | |
|---|---|---|---|
| 2,826,418 | 3/1958 | Johnson | 274—10 |
| 2,946,594 | 7/1960 | Staar | 274—10 |

LEONARD FORMAN, *Primary Examiner.*

JOEL M. FREED, *Assistant Examiner.*